United States Patent
Kim et al.

(10) Patent No.: US 7,200,866 B2
(45) Date of Patent: Apr. 3, 2007

(54) SYSTEM AND METHOD FOR DEFENDING AGAINST DISTRIBUTED DENIAL-OF-SERVICE ATTACK ON ACTIVE NETWORK

(75) Inventors: Hyun Joo Kim, Daejeon (KR); Jung-Chan Na, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 735 days.

(21) Appl. No.: 10/640,400

(22) Filed: Aug. 14, 2003

(65) Prior Publication Data

US 2004/0098618 A1 May 20, 2004

(30) Foreign Application Priority Data

Nov. 14, 2002 (KR) .................. 10-2002-0070686

(51) Int. Cl.
*G06F 11/00* (2006.01)
(52) U.S. Cl. .......................................... 726/23; 726/22
(58) Field of Classification Search ................ 726/1–4, 726/11, 22–25; 709/223–225
See application file for complete search history.

(56) References Cited

U.S. PATENT DOCUMENTS 6,324,656 B1 * 11/2001 Gleichauf et al. ............. 714/37
6,711,127 B1 * 3/2004 Gorman et al. ............. 370/230
6,741,171 B2 * 5/2004 Palka et al. .................. 340/501

FOREIGN PATENT DOCUMENTS

KR 2003-0021338 3/2003

OTHER PUBLICATIONS

Stamatis Karnouskos, "Dealing with Denial-of-Service Attacks in Agent-enabled Active and Programmable Infrastructures", Proceedings of the 25th Annual International Computer Software and Applications Conference (COMPSAC'01), IEEE, 2002.
Hyo-Chan Bang, Jung-Chan Na, Jong-Su Jang and Sung-Won Son, "Network intruder trace back mechanism in a Policy-based network security management framework", The Proceedings of Korea Information Processing Society Spring Conference 2002, vol. 9, No. 1.

* cited by examiner

*Primary Examiner*—Hosuk Song
(74) *Attorney, Agent, or Firm*—Mayer Brown Rowe & Maw LLP

(57) ABSTRACT

A system for defending against a distributed denial-of-service attack includes an intrusion detection system, an active security management system and an active security node. The intrusion detection system generates alert data if a denial-of-service attack is detected. The active security management system manages a domain, analyzes the alert data, generates and transmits a backtracking sensor in a case of the distributed denial-of-service attack, transmits mobile sensors to a host backtracked by the backtracking sensor to remove a master or an agent program within the host; and generates and transmits a backtracking sensor by using an IP address of a host that has transmitted a packet to the removed master or agent program. The active security node executes the transmitted backtracking sensor to backtrack an attacking host of the distributed denial-of-service attack and, if the backtracked host is determined as a real attacker, intercepts a traffic generated from the real attacker.

16 Claims, 3 Drawing Sheets

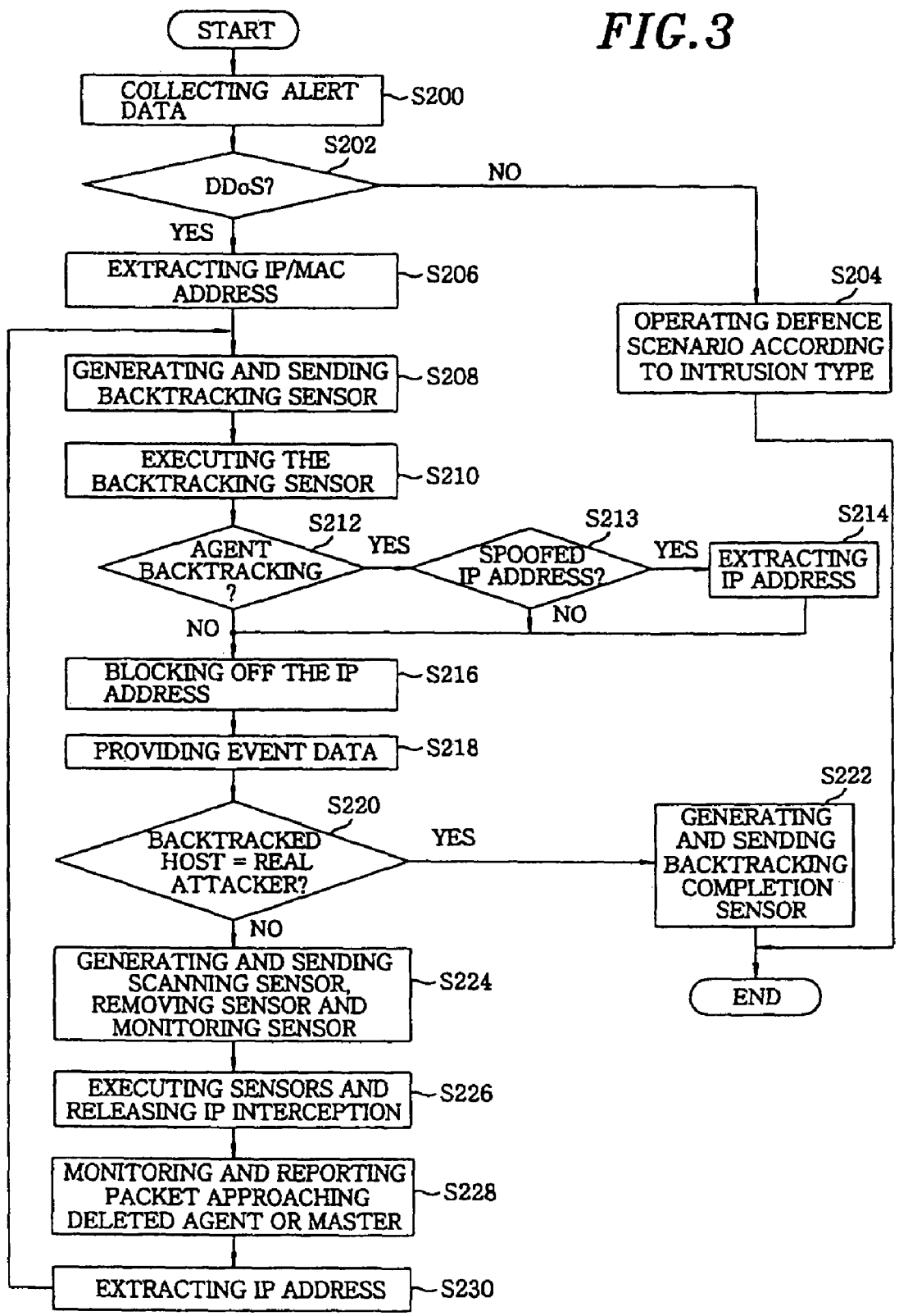

SYSTEM AND METHOD FOR DEFENDING AGAINST DISTRIBUTED DENIAL-OF-SERVICE ATTACK ON ACTIVE NETWORK

FIELD OF THE INVENTION

The present invention relates to a defense system against a distributed denial-of-service attack; and, more particularly, to a system and a method for defending against a distributed denial-of-service attack on active network by removing an agent and a master program for use in the distributed denial-of-service attack and isolating the attacker on the entire network.

BACKGROUND OF THE INVENTION

A conventional network security system can only protect its own domain by detecting a sign of intrusion and blocking off the traffic coming from an external intruder. In the conventional security system, however, the intruder can still surf the web freely even after he has failed to invade a first target domain, attempting another attack on other domains.

Further, the conventional security system has many drawbacks as follows. It is very difficult to build a cooperation system between many domains on a network in the conventional security system. Even for the same attack, data recognized at a certain domain cannot be shared by another domain on the same network. Further, the conventional security system is lack of capability of integrating related data in the different domains on a network level. Thus, it has been difficult to expect cooperation between the domains in defending against an attacker.

Therefore, there have been conducted an increasing number of researches for the purpose of developing a system capable of tracing the attacker, intercepting the traffic generated from a source of the attack and, further, isolating the attacker from the entire network by integration of data and cooperation between the domains that constitute the entire network.

One representative research of such kind is AN-IDR (Active Network-Intrusion Detection and Response), which is conducted as a DARPA (Defense Advanced Research Project Agency) project to overcome the shortcomings of the conventional network security system and complement IDIP (Intrusion Detection Isolation Protocol) instituted as one of SLSS (Survivability of Large Scale System) programs.

The AN-IDR provides a mechanism capable of effectively tracking and defending against the attacker through a series of processes of detecting an attack using TCP, UDP, or the like, performing backtracking based on data monitored by each router and isolating the attacker from the entire network by employing the IDIP system and a security management domain having a hierarchic structure.

However, the AN-IDR provides a way only effective for guarding against an attacker agent in coping with the distributed denial-of-service attack. Thus, the defense mechanism of the AN-IDR is operated as follows: first, the traffic from distributed attacker agents is blocked off; an agent serving as a source of the attacker agents is removed; and the traffic interception is released. In other words, since the AN-IDR removes only the agents used in the distributed denial-of-service attack, it is impossible to isolate the attacker from the entire network according to the AN-IDR, so that a second or a third attack of the attacker cannot be prevented in advance.

SUMMARY OF THE INVENTION

It is, therefore, an object of the present invention to provide a system and method for defending against a distributed denial-of-service attack on active network by performing a series of steps of removing an agent or a master program within a host, back-tracking an attacker by monitoring packets received at the removed program, and then isolating the attacker from the entire network to prevent any further attack of the attacker.

In accordance with one aspect of the present invention, there is provided a system for defending against a distributed denial-of-service attack including: an intrusion detection system for generating alert data if a denial-of-service attack is detected; an active security management system for managing a domain, analyzing the alert data to determine whether the denial-of-service attack is the distributed denial-of-service attack, generating and transmitting a backtracking sensor for backtracking an attacker of the distributed denial-of-service attack in a case of the distributed denial-of-service attack, transmitting mobile sensors to a host backtracked by the backtracking sensor to remove a master or an agent program within the host, generating and transmitting a backtracking sensor by using an IP address of a host that has transmitted a packet to the removed master or agent program; and an active security node located at a boundary of the domain, executing the transmitted backtracking sensor to backtrack an attacking host of the distributed denial-of-service attack and, if the backtracked host is determined as a real attacker, intercepting a traffic generated from the real attacker.

In accordance with another aspect of the present invention, there is provided a method for defending against a distributed denial-of-service attack by using an active security management system for backtracking and intercepting an attacker of the distributed denial-of-service attack based on alert data received from an intrusion detection system, the method including the steps of: extracting an IP address and a MAC address of a host from the alert data; generating a backtracking sensor for backtracking the host and transmitting the backtracking sensor to an active security node corresponding to the IP address of the host; executing the backtracking sensor by the active security node to backtrack the host; deleting an agent or a master program installed at the backtracked host; observing packets arriving at the deleted agent or master program, generating a backtracking sensor for backtracking a host transmitting the packets, and transmitting the backtracking sensor to the active security node; determining whether the host backtracked by the backtracking sensor is the real attacker; and blocking off traffic generated from an IP address of the real attacker if the backtracked host is the real attacker.

BRIEF DESCRIPTION OF THE DRAWINGS

The above and other objects and features of the present invention will become apparent from the following description of preferred embodiments given in conjunction with the accompanying drawings, in which:

FIG. 3 offers a flowchart describing operations of the active security management system in accordance with the present invention.

DETAILED DESCRIPTION OF THE PREFERRED EMBODIMENTS

Figure 1:
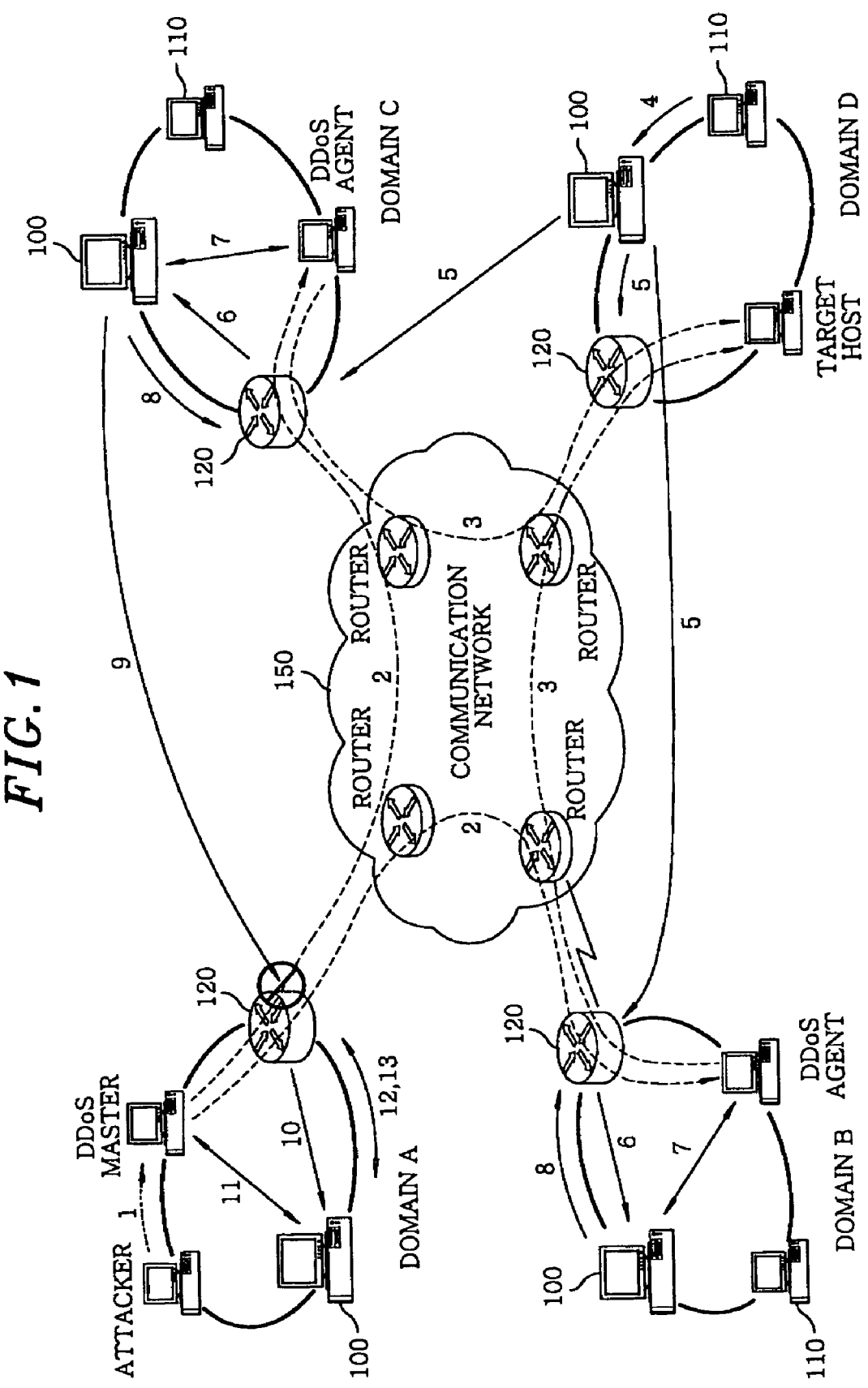
FIG. 1 illustrates a network configuration designed to defend against a distributed denial-of-service attack on an active network in accordance with the present invention.
Figure 2:
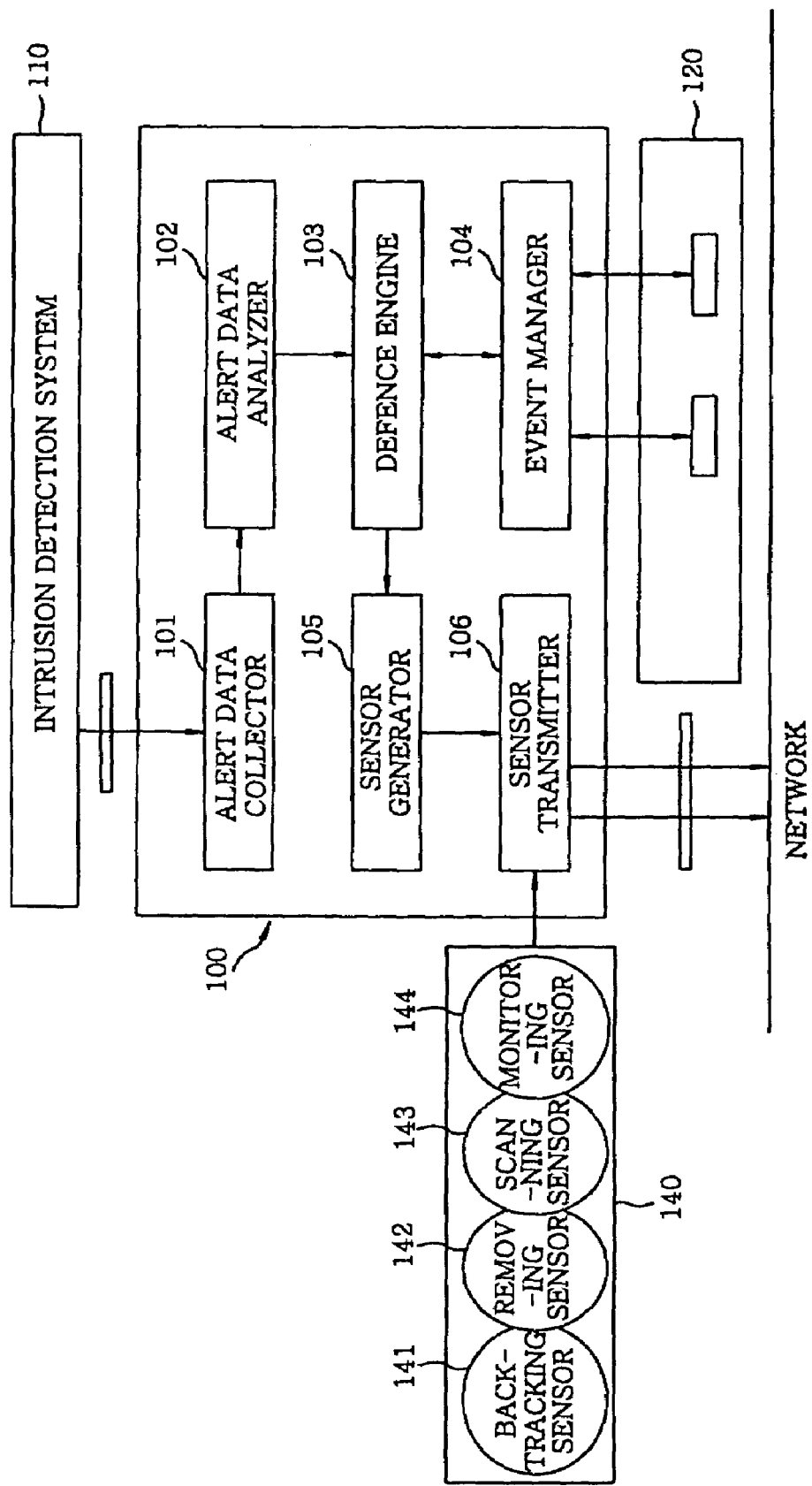
FIG. 2 is a block diagram of an active security management system in accordance with the present invention.

FIG. 1 illustrates a network for defending against a distributed denial-of-service attack on an active network in accordance with the present invention. FIG. 2 is a block diagram of an active security management system 100 in accordance with the present invention.

As shown in FIG. 1, the network for defending against the distributed denial-of-service attack includes a plurality of domains A, B, C, and D and a communications network 150. Each of the domains A, B, C, D includes the active security management system 100, a network-based intrusion detection system 110 and an active security node 120.

The active security system 100 manages and controls its domain, including the active security node 120. The active security management system 100 receives alert data from the network-based intrusion detection system 110 and generates and transmits mobile sensors 140 based on the received alert data. In particular, if the analysis result of the alert data shows that the distributed denial-of-service attack is attempted, the active security management system 100 generates and sends a backtracking sensor to backtrack an involved host. Thereafter, the active security management system 100 removes an agent or a master program installed at the backtracked host through the use of the mobile sensors 140 and, then, monitors packets received at the removed agent or master program to backtrack an attacker.

The active security management system 100 in one domain cooperates with active security management systems in other domains.

Referring to FIG. 2, there is provided a block diagram of the active security management system 100 in accordance with the present invention. The active security management system 100 includes an alert data collector 101, an alert data analyzer 102, a defense engine 103, an event manager 104, a sensor generator 105 and a sensor transmitter 106.

The alert data collector 101 collects the alert data from the network-based intrusion detection system 110 and transfers the alert data to the alert data analyzer 102. The alert data analyzer 102 analyzes the alert data and extracts therefrom data required for performing a backtracking process. Herein, the data for use in the backtracking process are, e.g., an IP address and a MAC address of a host that has transmitted attacking packets.

The sensor generator 105 generates a backtracking sensor 141 having information upon the IP and MAC address of the host that has transmitted the attacking packets based on the data extracted by the alert data analyzer 102. Then, the sensor transmitter 106 transmits the backtracking sensor 141 to an active security node 110 corresponding to the IP address recorded in the backtracking sensor 141.

The mobile sensors 140 generated by the sensor generator 105 are mobile codes executed at the active security node 120. The mobile sensors 140 include a scanning sensor 143, a removing sensor 142, a monitoring sensor 144 and a backtracking completion sensor (not shown) in addition to the backtracking sensor 141 described above. The scanning sensor 143 is executed in order to extract the agent or the master program for use in the distributed denial-of-service attack. The backtracking sensor 141 backtracks the host corresponding to the IP address extracted from the alert data or extracted by the monitoring sensor. The backtracking completion sensor 141 is generated by the active security node 120 at a time when the host backtracked by the backtracking sensor 141 is found to be the real attacker host. The backtracking completion sensor 141 informs the active security management system 100 that the backtracking process is finished. The active security management system 100 which has received the backtracking completion sensor notifies the completion of the backtracking process to the other active security management systems in the domains which have participated in the backtracking process.

The active security node 110 is located at a boundary of each domain to serve as a router. The active security node 110 executes the mobile sensors 140 sent from the active security management system 100 to backtrack the packets generated by the distributed denial-of-service attack, finds the host having the agent or the master program installed therein, and blocks or releases the traffic sent from the IP address of the backtracked host.

The mobile sensors 140 sent by the sensor transmitter 106 are executed at the active security node 120 located at the boundary of each domain. After executing the mobile sensors 140, the active security node 120 reports the result to the active security management system 100 by using a reporting function.

The active security node 120 has a mapping table by which an IP address and a MAC address existing within its domain can be matched, and extracts a spoofed IP address on the basis of the mapping table and defends against a spoofed IP attack.

Next, operations of the active security management system 100 will be described hereinafter with reference to FIG. 3. FIG. 3 is a flowchart for defending against the distributed denial-of-service attack.

First, the alert data collector 101 of the active security management system 100 collects intrusion alert data from the network-based intrusion detection system 110 (Step 200). Then, the alert data analyzer 102 conducts an analysis of the intrusion alert data and determines whether the intrusion is of a distributed denial-of-service attack type (Step 202).

If it is determined in the step 202 that the intrusion is not of the distributed denial-of-service attack type, the active security management system 100 operates a defense scenario according to the intrusion type (Step 204).

If, however, the intrusion is found to be of the distributed denial-of-service attack type in the step 202, the active security management system 100 investigates packets of the distributed denial-of-service attack to extract an IP address and a MAC address of the host which has transmitted the packets (Step 206). Thereafter, the active security management system 100 generates and sends a backtracking sensor 141 in order to remove an agent or a master program serving for the distributed denial-of-service attack. The backtracking sensor 141 has information on the IP address and the Mac address of an involved host.

After transmitted to the active security node 120 located at a boundary of the domain where the agent or the master program serving for the distributed denial-of service attack is installed, the backtracking sensor 141 is executed thereat (Step 210). At this time, it is determined whether the backtracking sensor is backtracking the agent program or the master program (step 212).

In case of the master backtracking, the active security node 120 blocks off the traffic generated from the host corresponding to the newly extracted IP address (Step 216). In case of the agent backtracking, it is determined whether the source IP address recorded in the backtracking sensor 141 coincides with the MAC address recorded in the mapping table within the active security node 120 (Step 213). If the two are not same, the active security node 120 concludes that the distributed denial-of-service attack is made by using a spoofed IP address and, then, extracts an IP address of a real agent on the basis of the MAC address contained in the backtracking sensor 141 (Step 214). Then, the active security node 120 blocks off the traffic generated from the host corresponding to the newly extracted IP address (Step 216).

If it is found in the Step 212, however, that the source IP address recorded in the backtracking sensor 141 coincides with the MAC address recorded in the mapping table of the active security node 120, the active security node 120 directly proceeds to the Step 216 to block off the traffic sent from the IP address contained in the backtracking sensor 141.

After executing the backtracking sensor 140, the active security node 120 provides event data corresponding to interception or release of the traffic to the event manager 104 in the active security management system 100 (Step 218). The active security management system 100 determines whether the backtracked host is a real attacker (Step 220). If the backtracked host is the real attacker, a backtracking completion sensor is generated and transmitted (Step 222); if not, the active security management system 100 generates a scanning sensor 143, a removing sensor 142 and a monitoring sensor 144 and transmits them to the backtracked host in order to remove an agent or a master program installed therein (Step 224).

The scanning sensor 143, the removing sensor 142 and the monitoring sensor 144 are executed as follows. First, the scanning sensor 143 searches for the agent or the master program installed at the backtracked host by performing a scanning depending on various types of distributed denial-of-service attacks. Then, the removing sensor 142 removes the agent or the master program found by the scanning sensor 143. The active security management system 100 releases IP interception of the host which has been blocked off by the active security node 120 (Step 226). The monitoring sensor 144 observes packets arriving at the deleted agent or master program. If a packet is detected to approach a port used by the deleted agent or master program, the monitoring sensor 144 reports the fact to the active security management system 100 (Step 228).

Afterwards, the active security management system 100 extracts the IP address of the packet reported by the monitoring sensor 144 (Step 230).

The backtracking process performed by the active security management system 100 is a process for deleting the agent or the master program which are used for the distributed denial-of-service attack. The steps from 208 to 230 are repeated based on the IP address obtained in the Step 230. That is, a backtracking sensor is generated and transmitted to the host where the agent or the master program is installed; the agent or the master program is deleted; and packets approaching the deleted agent or master program are monitored in order to extract the IP address of the attacker.

The active security management system 100 repeatedly performs the above-described process. If the source IP address of the packet reported by the monitoring sensor 144 proves to be the attacker's address, the active security management system 100 blocks off the traffic coming from the attacker IP, thereby isolating the attacker from the entire network.

The following is a detailed description of the active security management system 100 in accordance with the present invention which operates to defend against the distributed denial-of-service attack. The description will be provided with reference to FIG. 1.

As shown in FIG. 1, an attacker within domain A installs a Distributed Denial of Service (DDoS) master program at an arbitrary host in the domain A and installs DDoS agent programs at hosts in domains B and C by using the DDoS master program in order to make a denial-of-service attack on a host in domain D (hereinafter, referred to as a target host). The attacker attacks the target host in the domain D via channels 2 and 3 by using the DDoS master and agent programs.

Once the attack is begun, the active security management system 100 collects and analyzes alert data sent from the intrusion detection system 110 (See 4) and generates a backtracking sensor 141 to backtrack a host that has transmitted attacking packets to the target host. The backtracking sensor 141 is sent to active security nodes 120 in the domains B and C that have transmitted the attacking packets (See 5).

If an IP address recorded in the backtracking sensor 141 and a MAC address in a mapping table are not coincident with each other, the active security node 120 extracts an IP address corresponding to the MAC address in the mapping table. Then, the active security node 120 blocks off the traffic generated from the host corresponding to the extracted IP address and reports the traffic interception to active security management systems 100 in the domains B and C (See 6).

Each of the active security management systems 100 in the domains B and C generates a scanning sensor 143, a removing sensor 142 and a monitoring sensor 144 and sends them to the host corresponding to the extracted IP address in order to remove the DDoS agent program installed therein (See 7).

The active security management system 100 executes the scanning sensor 143 and the removing sensor 142 within said host and deletes the DDoS agent program installed therein. Afterwards, the active security management system 100 executes the monitoring sensor 144 to observe packets arriving at the deleted DDoS agent program. The monitoring sensor 144 sends the monitoring data to the active security management system 100.

The active security management system 100 commands the active security node 120 to release the IP interception after deleting the DDoS agent program (See 8).

The active security management system 100 extracts from the monitoring data an IP address and a MAC address of the packets arriving at the deleted DDoS agent program and, then, generates again a backtracking sensor 141 and transmits the backtracking sensor 141 to the active security node 120 in the domain A, which corresponds to the extracted IP address (See 9).

The active security node 120 in the domain A backtracks the host corresponding to the IP address specified in the backtracking sensor 141 and blocks off the traffic generated therefrom. The active security node 120 then reports the result to the active security management system 100 (See 10).

The active security management system 100 generates a scanning sensor 143, a removing sensor 142 and a monitoring sensor 144 and sends them to the host where the DDoS master program is installed. Then, the active security management system 100 executes the scanning sensor 143, the removing sensor 142 and the monitoring sensor 144 to thereby remove the DDoS master program and obtain monitoring data (See 11). The monitoring data refers to data sent from the monitoring sensor 144, which serves to monitor packets received at the deleted DDoS master program. The active security management system 100 commands the active security node 120 to release the IP interception after deleting the DDoS master program (See 12).

The active security management system 100 extracts the IP address of the real attacker from the monitoring data, generates a backtracking sensor based on the extracted IP address and sends the backtracking sensor to an active security node 120 in a domain corresponding to the IP address of the real attacker (See 13). In the example shown in FIG. 1, the IP address of the attacker exists in the domain A. Thus, the active security node 120 in the domain A executes the backtracking sensor and blocks off the traffic generated by the real attacker, thereby isolating the attacker from the entire network.

Subsequently, the active security node 120 generates a backtracking completion sensor for notifying the completion of the backtracking process and provides the backtracking completion sensor to the active security management system 100. Then, the active security management system 100 sends the backtracking completion sensor to the other active security systems in the domains that have participated in the backtracking process.

While the invention has been shown and described with respect to the preferred embodiments, it will be understood by those skilled in the art that various changes and modifications may be made without departing from the spirit and scope of the invention as defined in the following claims.

What is claimed is:

1. A system for defending against a distributed denial-of-service attack comprising:
   an intrusion detection system for generating alert data if a denial-of-service attack is detected;
   an active security management system for managing a domain, analyzing the alert data to determine whether the denial-of-service attack is the distributed denial-of-service attack, generating and transmitting a backtracking sensor for backtracking an attacker of the distributed denial-of-service attack in a case of the distributed denial-of-service attack, transmitting mobile sensors to a host backtracked by the backtracking sensor to remove a master or an agent program within the host, generating and transmitting a backtracking sensor by using an IP address of a host that has transmitted a packet to the removed master or agent program; and
   an active security node located at a boundary of the domain, executing the transmitted backtracking sensor to backtrack an attacking host of the distributed denial-of-service attack and, if the backtracked host is determined as a real attacker, intercepting a traffic generated from the real attacker.

2. The system of claim 1, wherein the active security management system includes:
   an alert data collector for collecting the alert data provided from the intrusion detection system;
   an alert data analyzer for extracting an IP address and a MAC address of the attacker of the distributed denial-of-service attack from the collected alert data;
   a sensor generator for generating a backtracking sensor having the IP address and the MAC address; and
   a sensor transmitter for transmitting the backtracking sensor to the IP address of the attacker of the distributed denial-of-service attack.

3. The system of claim 1, wherein the active security node has a mapping table in which a MAC address is recorded and wherein the active security node extracts an IP address corresponding to the MAC address contained in the backtracking sensor if the IP address in the backtracking sensor is not coincident with the MAC address recorded in the mapping table and, then, blocks off traffic generated from the extracted IP address.

4. The system of claim 1, wherein the active security management system sends an IP interception release command to the active security node after deleting the master or the agent program.

5. The system of claim 4, wherein the active security node generates a backtracking completion sensor after releasing the interception of the traffic generated from the host in response to the IP interception release command from the active security management system and then transmits the backtracking completion sensor to the active security management system.

6. The system of claim 1, wherein the mobile sensors include a scanning sensor, a monitoring sensor, and a removing sensor for extracting an agent or a master program installed at the host and used for the distributed denial-of-service attack.

7. The system of claim 6, wherein the scanning sensor searches for an agent or a master program for use in a distributed denial-of-service attack installed at the backtracked host by performing scanning depending on various types of the distributed denial-of-service attack.

8. The system of claim 6, wherein the removing sensor deletes an agent or a master program for use in a distributed denial-of-service attack which is found by the scanning sensor.

9. The system of claim 6, wherein the monitoring sensor observes packets arriving at the deleted agent or master program.

10. The system of claim 1, wherein the active security node has a reporting function for reporting execution result data corresponding to a host backtracked by the backtracking sensor.

11. A method for defending against a distributed denial-of-service attack by using an active security management system for backtracking and intercepting an attacker of the distributed denial-of-service attack based on alert data received from an intrusion detection system, the method comprising the steps of:
   extracting an IP address and a MAC address of a host from the alert data;
   generating a backtracking sensor for backtracking the host and transmitting the backtracking sensor to an active security node corresponding to the IP address of the host;
   executing the backtracking sensor by the active security node to backtrack the host;
   deleting an agent or a master program installed at the backtracked host;
   observing packets arriving at the deleted agent or master program, generating a backtracking sensor for backtracking a host transmitting the packets, and transmitting the backtracking sensor to the active security node;
   determining whether the host backtracked by the backtracking sensor is the real attacker; and
   blocking off traffic generated from an IP address of the real attacker if the backtracked host is the real attacker.

12. The method of claim 11, wherein the host backtracking step includes the steps of:
   checking whether the IP address of the host is coincident with a MAC address in a mapping table of the active security node; and
   intercepting or releasing traffic generated from the IP address if the IP address is coincident with the MAC address and sending result data to the active security management system.

13. The method of claim 12, wherein, if the IP address is not coincident with the MAC address, the active security node extracts a real IP address of a host based on the MAC address contained in the backtracking sensor and intercepting or releasing traffic generated from the extracted IP address.

14. The method of claim 11, wherein the active security node generates a backtracking completion sensor and transmits the backtracking completion sensor to the active security management system if the backtracked host is the real attacker.

15. The method of claim 11, further comprising the steps of:

transmitting mobile sensors to the backtracked host in order to delete an agent or a master program installed therein if the backtracked host is not the real attacker;

deleting the agent or the master program by executing the mobile sensors and extracting a source IP address of a packet arriving at the deleted agent or master program; and generating a backtracking sensor based on the source IP address and transmitting the backtracking sensor to an active security node corresponding to the source IP address to backtrack an attacking host of the distributed denial-of-service attack.

16. The method of claim 15, wherein the mobile sensors include a scanning sensor for searching for an agent or a master program used in the distributed denial-of-service attack, a removing sensor for deleting the agent or the master program, and a monitoring sensor for monitoring a packet arriving at the deleted agent or master program.

* * * * *